Patented June 30, 1936

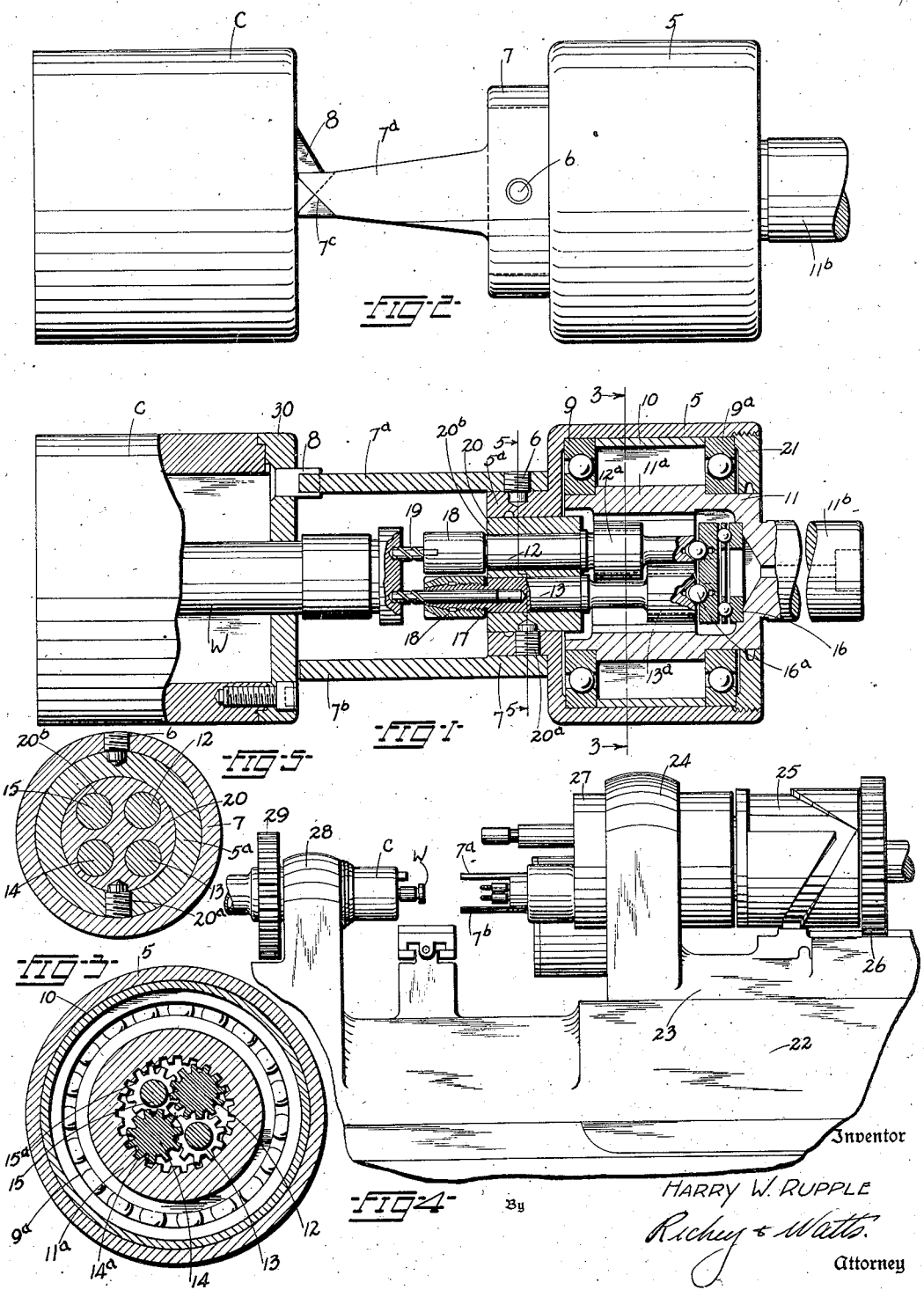

2,045,891

UNITED STATES PATENT OFFICE 2,045,891

MULTISPINDLE DRILL HEAD

Harry W. Rupple, Shaker Heights, Ohio, assignor to The Cleveland Automatic Machine Company, Cleveland, Ohio, a corporation of Ohio Application January 21, 1935, Serial No. 2,657

1 Claim. (Cl. 29—40)

This invention relates broadly to multi-spindle drill heads, and more specifically to improvements therein which contemplate, among other advantages a closer center to center relation of the drill spindles than has been constructed heretofore in drill heads of this type.

One of the objects of this invention is to provide an improved type of drill head assembly which is adapted for use upon automatic screw machines, drill presses and similar machine tools having an inadequate number of driven spindles to accommodate the tooling requirements of the machining operation.

Another object of the invention is to provide a compact drill head assembly for simultaneously drilling a plurality of holes within a confined area in the work.

Another object of the invention is to provide a multi-spindle drill head which will drill a plurality of holes in the work in accurately spaced relation.

The foregoing and other objects and advantages will become apparent in view of the following description taken in conjunction with the drawing, wherein:

Figure 1 is a view in substantially central longitudinal section of a multiple drill head embodying the features of the invention, showing the drills operating on the stock held in a screw machine collet;

Figure 2 is a plan view of the drill head and collet shown in Figure 1;

Figure 3 is a section taken on the line 3—3, Figure 1;

Figure 4 is a fragmentary view in side elevation of an automatic screw machine illustrating the relation of the improved drill head therewith; and Figure 5 is a sectional view taken on the line 5—5, Figure 1.

In the embodiment illustrated in the drawing, wherein the drill head is shown coordinated with a screw machine of the rotatable spindle type, the drill head comprises a housing 5 having a reduced end portion 5a, upon which there is secured by means of studs 6, a driving member 7. The driving member comprises a pair of forwardly projecting arms 7a and 7b, having tapered end portions 7c to assure the driving engagement thereof with a lug 8 carried by the rotatively driven chuck or collet C.

Within the housing 5 there is a pair of antifriction bearings 9 and 9a retained in spaced relation by a collar 10. The inner races of the bearings 9 and 9a are mounted upon the drill head body 11 which comprises an internally-toothed gear head 11a and a shank portion 11b adapted for supporting engagement within the screw machine turret head.

The gear head 11a embodies a portion of a planetary gearing system which includes geared drill spindles 12, 13, 14 and 15, illustrated in the present embodiment.

The inner ends of the respective spindles are formed with pinions 12a, 13a, 14a and 15a, intermeshed with the gear head 11a and longitudinally staggered in relation with each other. The shanks of the spindles adjacent alternate pinions in the assembly are reduced or necked to provide a clearance for the contiguous pinion and thus facilitate the grouping of the spindles within a minimized center to center distance.

The ends of the spindles are preferably recessed to accommodate the reception of a ball 16a forming part of a thrust bearing assembly, generally indicated at 16, which is mounted in the rearward portion of the gear head 11a. The forward ends of the spindles are provided with chucks 17 which retain the drills 19 in operative position in the usual and well known manner in the art.

A combined bearing and drive bushing 20 are secured in the reduced portion 5a of the housing 5 by studs 20a, the respective spindles being journaled in separate longitudinal journals 20b therein (note particularly Figure 5). The inner end of the housing 5 is provided with a retaining ring or plate 21 preferably screw threaded in the shell of the housing to facilitate adjustment of the bearings 9 and 9a therein.

As the tool turret is advanced the ends of the arms 7a and 7b will engage the driving lug 8 of the collet C and the housing 5 and the bushing 20 secured thereto will be rotatively driven thereby. Since the drill spindles 12, 13, 14 and 15 are journaled in the bushing 20, the spindles will revolve bodily or as a unit about the axis of the collet but since the gear head 11a is held rotatively immobile in the turret the spindle gears 12a, 13a, 14a and 15a meshed with the teeth of the gear head will be separately driven and thus effect the drilling operation in the work.

The improved drill head assembly illustrated herein is shown as operatively associated with an automatic screw machine of the usual form save for the application of the driving lug upon the collet C. Briefly, the machine illustrated comprises a bed 22 upon which there is mounted a tail stock 23 having a turret bearing 24 thereon which supports a cam drum 25, a gear 26 and tool turret 27. The turret is reciprocated towards and away from the work by the cam 25 and intermittently indexed through the gear 26. The collet C is rotatively mounted in the head stock 28 being driven by a gear 29 coordinated with the power driving medium for the machine. The driving stud 8 as illustrated herein is mounted upon an end plate 30 secured in the extended end portion of the collet C.

The operative cycle of the machine illustrated in Figure 1 shows the drills engaged in the work W, while in Figure 4 the turret 27 is shown in its retracted position. When the turret 27 is advanced toward the work, the tapered ends of either of the arms 7a or 7b engage the driving lug 8 in the manner illustrated in Figure 1. The angular end portions 7c of the arms providing clearance for the lug 8 when the arms are advanced toward the collet just after the lug has passed horizontal alignment therewith.

It is preferred to provide a plurality of the arms 7a and 7b in order to assure rotation of the drill head assembly before the drills engage the work. It is also desirable to adjust the length of the drills to prevent abutment thereof with the work until the arms 7a and 7b have engaged the lug 8.

It will be understood that the number of drill spindles may be varied to accommodate the character of the work and that the size of the drills may likewise be varied with respect to one another, moreover that the spindle gears may be changed to effect the ratio of rotation of the respective spindles concordant with the size or diameter of the drills carried thereby. It will also be understood that a reversal of parts, as for instance a rotatable spindle and a stationary sleeve is contemplated in the present invention and that such modification in structure may be adopted without departing from the spirit of the invention as defined by the appended claim, which has been phrased with a view of covering such changes and modifications as are within the scope of the invention.

I claim:

In combination with an automatic screw machine having a rotatable work holding chuck and a reciprocable non-rotative tool carrier slide, a multiple drill head therefor comprising an internal gear, non-rotatively mounted in said tool slide, anti-friction bearings mounted on the periphery of said internal gear, a housing mounted on said anti-friction bearings, a driving arm mounted on said housing, operatively engageable with said chuck to rotatively drive said housing, a bearing in said housing rotatable therewith, a plurality of spindles journalled in said bearing, drill chucks on ends thereof, pinions on said spindles arranged in longitudinal staggered relation and intermeshed with said internal gear, the shanks of the circumferentially adjacent spindles being necked to afford a clearance for circumferentially adjacent pinions, a ball thrust bearing in the inner end of each spindle, an anti-friction thrust bearing supporting said balls, said balls constituting thrust bearings and retaining said spindles in parallel alignment with each other.

HARRY W. RUPPLE.